United States Patent [19]
Shreve

[11] 3,899,055
[45] Aug. 12, 1975

[54] BRAKE ACTUATING MECHANISM

[76] Inventor: Russell L. Shreve, 915 W. Wattles Rd., Troy, Mich. 48084

[22] Filed: Feb. 8, 1974

[21] Appl. No.: 440,673

[52] U.S. Cl................................ 188/344; 188/349
[51] Int. Cl. .......................... B62l 3/04; B60t 11/02
[58] Field of Search ................ 188/24, 26, 344, 349

[56] References Cited
UNITED STATES PATENTS

| | | | |
|---|---|---|---|
| 1,910,527 | 5/1933 | Dormoy | 188/26 X |
| 3,214,914 | 11/1965 | Kling | 188/349 X |
| 3,554,334 | 1/1971 | Shimano et al. | 188/349 |
| 3,782,507 | 1/1974 | Shreve | 188/2 D |

FOREIGN PATENTS OR APPLICATIONS

| | | | |
|---|---|---|---|
| 1,239,805 | 7/1971 | United Kingdom | 188/344 |

Primary Examiner—George E. A. Halvosa

[57] ABSTRACT

A brake actuating mechanism is provided for two wheel vehicles such as motorcycles, motor bikes or the like having a hydraulic front wheel brake and a mechanical rear wheel brake. The mechanism is operable in response to actuation of a brake pedal to apply the rear wheel brake prior to the front wheel brake whereby to preclude excessive front wheel braking. The mechanism comprises a housing defining a fluid cylinder which is adapted to be mounted on the rear brake lever arm and includes a piston located in the cylinder which is operatively connected to the brake pedal connecting rod.

4 Claims, 4 Drawing Figures

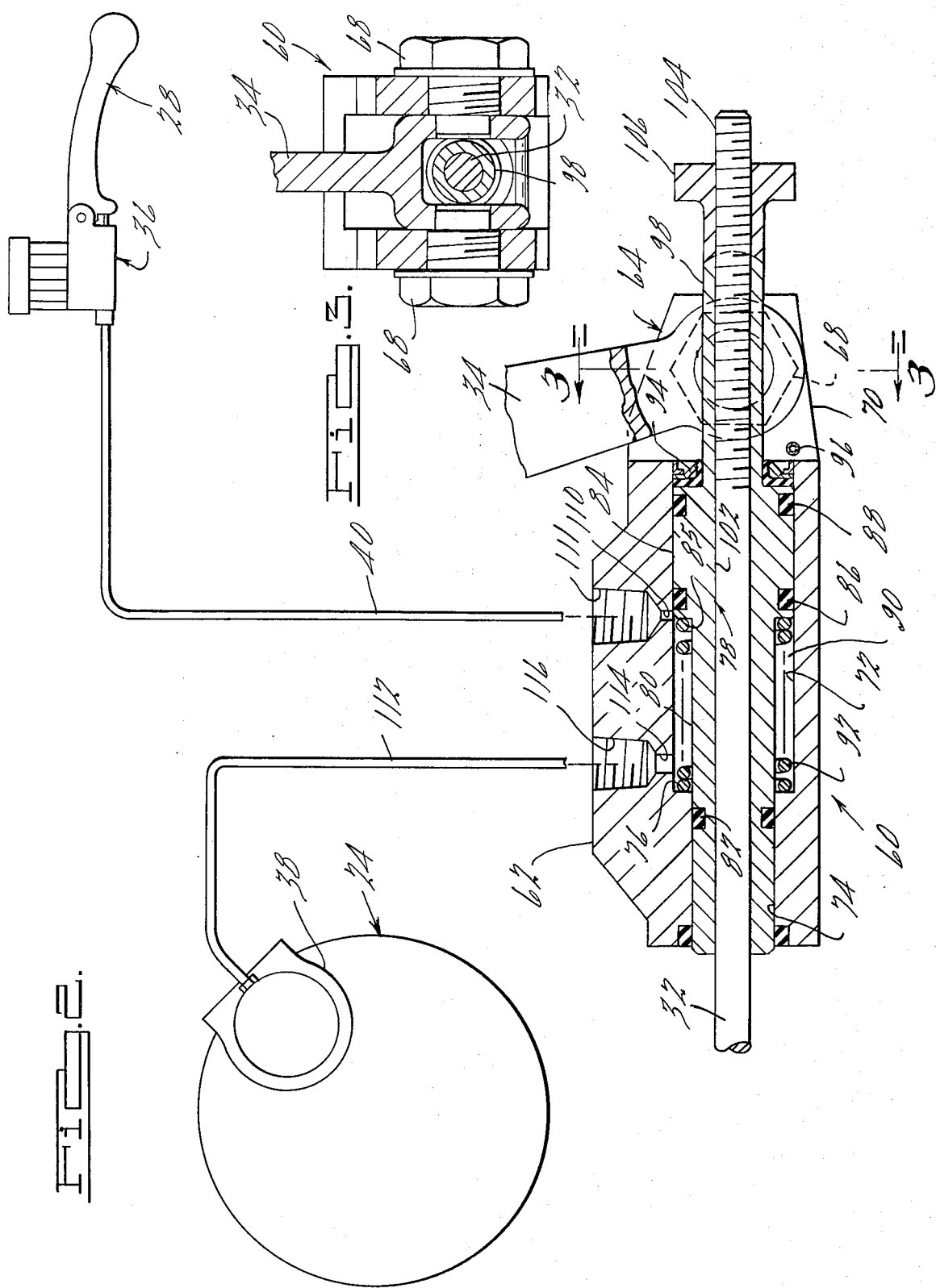

BRAKE ACTUATING MECHANISM

BACKGROUND AND SUMMARY OF THE INVENTION

The present invention relates generally to the braking arts, and more particularly to a brake actuating mechanism for a two-wheeled vehicle having a mechanical rear wheel brake and a hydraulic front wheel brake.

It has been previously recognized that a two wheel vehicle, such as a motorcycle or the like is inherently extremely sensitive to excessive braking of the front wheel relative to the rear wheel. If the front wheel brake is applied too rapidly relative to the rear wheel brake, the vehicle becomes unstable and can result in the possible loss of vehicle control. On the other hand, it has been found that the front brake of a two-wheeled vehicle has greater braking capability without skidding during deceleration of the vehicle due to a weight shift or weight transfer from the rear wheel to the front wheel. Such two-wheeled vehicles are typically provided with a foot operated rear brake and a hand operated front brake. In many cases, because of the undesirable sensitivity of the vehicle to overbraking at the front brake, the vehicle operator will use the hand operated control minimally, if at all; which, of course, prevents instability but results in increased stopping distances since the front wheel brakes are not being effectively used. When each of the front and rear brakes are of a mechanical type, it has previously been proposed to provide a mechanism to automatically actuate the front wheel brake subsequent to the rear wheel brake in response to the operation of the foot pedal. For examples of typical exemplary mechanisms, reference may be had to U.S. Pat. No. 3,782,507 and West German Pat. No. 714,767.

The present invention is directed toward a novel brake actuating mechanism for motorcycles, motor bikes and related vehicles having a hydraulic front wheel brake and a mechanical rear wheel brake. The mechanism is adapted to overcome excessive front wheel braking by proportioning the application of front wheel and rear wheel braking such that the front wheel brake is not actuated excessively relative to the rear wheel brake. More particularly, the present invention is directed toward a novel brake actuating mechanism which, upon application of a single operator controlled device, is adapted to subsequently apply first the rear wheel brake and thereafter the front wheel brake of the vehicle, whereby the problem of excessive front wheel braking is minimized, while still taking advantage of the increased front brake capability during deceleration. Thus, the mechanism of the present invention is subject to optimize the application of each of the front and rear brakes while minimizing the possibility of loss of control due to instability. The mechanism can be provided as a standard accessory by the original equipment manufacturer or alternatively can be retro-fitted to existing bikes as an after market option.

It is accordingly a general object of the present invention to provide a novel brake actuating mechanism of the above described character adapted for use with a cycle having a mechanical rear wheel brake and a hydraulic front wheel brake.

It is a more particular object of the present invention to provide a novel brake actuating mechanism, as described above, which may be conveniently applied to existing motorcycle, motor bike, etc. brake systems, or alternatively may be provided as a standard accessory by the original equipment manufacturer.

It is another object of the present invention to provide a novel brake actuating mechanism of the above described type which is of an extremely simple design and is economical to manufacture.

It is still another object of the present invention to provide a novel brake actuating mechanism for two wheel vehicles which automatically sequentially actuates or applies the front and rear brakes of the vehicle upon actuation, for example, of a foot operated brake pedal, and which also permits independent actuation of the front wheel brake, for example, by actuation of a conventional hand brake lever on the vehicle handle bar.

Other objects, features and advantages of the present invention will become apparent from the following detailed description taken in conjunction with the accompanying drawings.

BRIEF DESCRIPTION OF THE DRAWINGS

FIG. 2 is a fragmentary schematic diagram of the braking system illustrated in FIG. 1 including a cross-sectional elevation of the brake actuating mechanism;

FIG. 3 is a transverse cross-sectional view of the mechanism illustrated in FIG. 2 taken along the lines 3—3 thereof.

DETAILED DESCRIPTION OF THE PREFERRED EMBODIMENT

Figure 1:
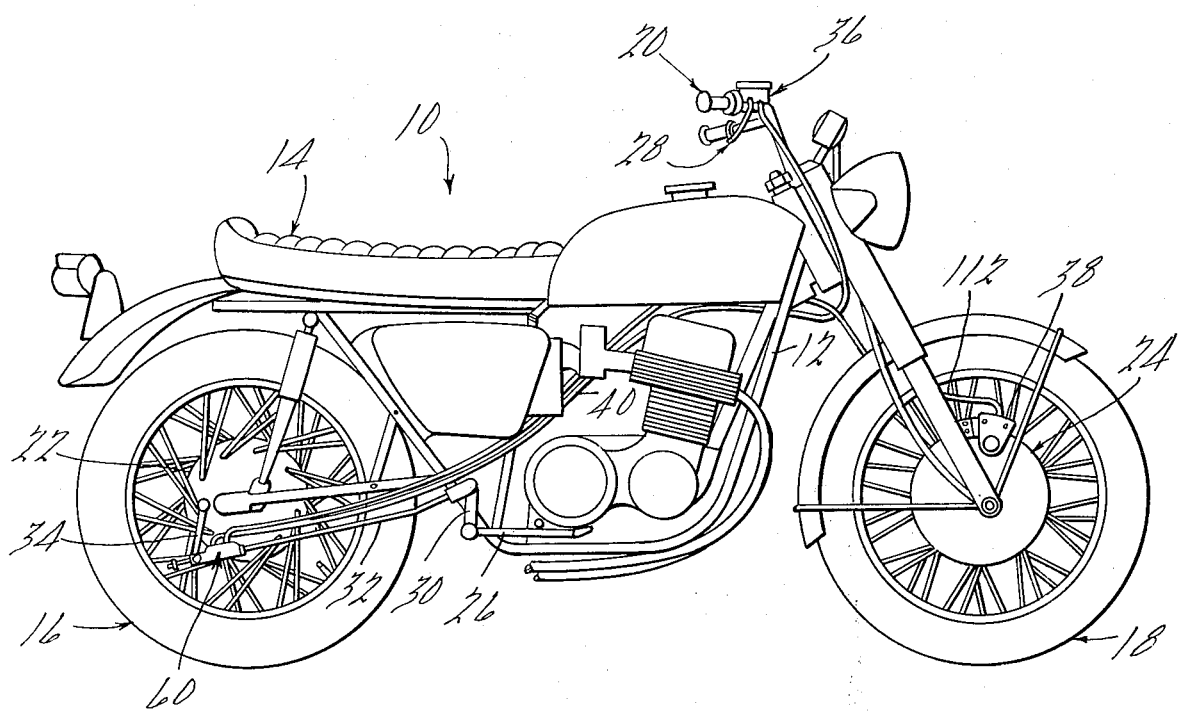
FIG. 1 is a side elevational view of an exemplary two-wheeled vehicle having a hydraulic front wheel braking system and a mechanical rear wheel braking system, and having a brake actuating mechanism in accordance with the present invention operatively installed thereon.

Referring now to FIG. 1 of the drawings, an exemplary two wheel vehicle, such as a motorcycle, motor bike or the like is indicated generally at 10. The vehicle 10 comprises a frame structure 12 having an operator supporting seat 14, and supported at opposite ends by a driving rear wheel 16 and a front wheel 18, the latter being steerable by means of a conventional handle bar 20. In accordance with the present invention, the vehicle 10 is provided with a mechanical rear brake 22 and a hydraulic front brake 24, the former of which is conventionally actuatable by means of a foot operated brake pedal 26 and the latter of which is operable by means of the pedal 26 and/or a hand brake lever 28 mounted on the handle 20. The brake pedal 26 is conventionally connected to the rear brake 22 by an actuating arm 30 connected to one end of a connecting rod 32, and opposite end normally being connected to the lower end of a rear brake lever 34 via a suitable clevis or bracket (not shown). The hand brake lever 28 on the other hand is operatively connected in a combination-reservoir-master cylinder assembly 36. The assembly 36 provides a source of pressurized hydraulic fluid, and is in fluid communication with a suitable brake caliper 38 via a section of conduit or tubing 40.

In accordance with the principles of the present invention, the vehicle 10 is provided with a brake actuating mechanism, generally designated by the numeral 60, which comprises an elongated body or housing 62 pivotably connected in lieu of the clevis to the rear brake lever 34 and slidably supported on the opposite end of the connecting rod 32. As best seen in FIGS. 2 and 3, the right end of the housing 62 is formed to provide a clevis or U-shaped bracketing section 64 which is adapted to be pivotably connected to the rear brake lever 34 via a pair of transversely opposed trunnion bolts 68. Each of the trunnion bolts 68 are threadably engaged to aligned apertures formed in the laterally spaced sidewalls of the section 64, and each of the bolts include end portions which engage and rotatably support the bifurcated ends of the lever 34. The housing 62 also is provided with a first axially extending, cylindrically shaped passage 72 which defines a working cylinder for a piston 78, and a second coaxially formed passage 74 which is diametrically reduced relative to the passage 72 and defines a radially extending, annularly shaped shoulder 76 therewith.

A left end 80 of the piston 78 is slidably supported in the passage 74 and fluidly sealed by a suitable gasket or O-ring 82 carried in an annular shaped groove disposed in the outer peripheral surface thereof. The piston 78 includes a supporting or guiding section 84 which forms an annular shaped shoulder 85 at the left end thereof. The section 84 is slidably supported within the passage 72 and is fluidly sealed by a pair of axially spaced gaskets or O-rings 86 and 88. An annular shaped passage 90 is defined by the inner peripheral surface of the passage 72 and the outer peripheral surface of the section 80. This piston 78 is biased toward the right end of the housing 62 by a coil spring 92, the latter having oppositely spaced end portions bearing respectively against the shoulders 76 and 85. The piston 78 is slidably retained within the passage 72 by a combination dirt shield and retaining ring 94 which is press fitted with the passage 72 and precluded from outward movement by a connector pin 96. A right end section 98 of the piston 78 projects outwardly and to the right, as viewed in FIG. 2, and as shall hereinafter be described, is utilized for adjustably connecting the mechanism 60 relative to the linkage connecting the foot pedal 26. The piston 78 is also provided with an axially extending, centrally located bore or passage 102 adapted to slidably receive an end section of the connecting rod 32, and opposite end section being pivotably connected to the actuating arm 30. The right end of the connecting rod 32 is externally threaded as indicated at 104 and is adapted to cooperatively receive a suitable adjustment screw 106. The inward end of the screw 106 bears against the outer end of the section 98. In response to tightening or loosening the screw 106, a preselected degree of lost motion can be provided between the foot pedal 26 and the rear brake 22.

As indicated above, the front wheel hydraulic brake 24 is normally or conventionally operable in response to actuating the hand grip 28. To facilitate operating the front brake 24 from the foot pedal 26, the mechanism 60 is operatively interposed therebetween. More particularly, it will be seen that the fluid passage 90 is in fluid communication with the master cylinder 36 via the section of conduit 40 and a radially extending passage 110 formed in the housing 62. The outer radial end of the passage 110 includes an enlarged threaded section 111 which is adapted to cooperatively receive a suitable fluid conduit fitting (not shown). Correspondingly, an opposite end of the fluid passage 90 is in fluid communication with the caliper 38 via a section of tubing or conduit 112 and a radially extending passage 114, the latter also including an enlarged threaded section 116 adapted to cooperatively receive a suitable conduit fitting (not shown). In the relative position of the piston element 78 viewed in FIG. 2, it will be noted that the passage 90 fluidly communicates each of the conduits 40 and 112.

Referring now to the overall operation of the brake actuating mechanism 60, at such times as the operator of the vehicle is desirous of applying the vehicle brakes, depression of the foot operated pedal 26 results in clockwise pivotal movement of the actuating arm 30. Such pivotal movement of the arm 30 in turn causes longitudinal forward movement of the connecting rod 32 and simultaneous forward movement (to the left as viewed in FIG. 2) of the entire housing 62. As the housing moves forward, the connecting rod 32 will also move to the left to effect counterclockwise pivotal movement of the rear brake lever 34 and thus initiate the application of the rear wheel brake 22. As the housing member 62 continues to move to the left in response to further application of the foot pedal 26, the bias or force of the spring 92 which urges the piston 78 to the right is overcome resulting in relative axial movement between the housing 62 and the piston 78. The initial relative displacement between the piston 78 and the housing 62 causes the enlarged section of the piston 84 to block or cover the port 110 and fluidly isolate the system of the combination reservoir-master cylinder 36 from the brake caliper 38. Simultaneously, the fluid located in the brake caliper 38, the conduit 112, and the cylinder passage 90 is subject to be pressurized which results in the application of the front brakes. It will, therefore, be seen that the front brake 24 will be applied after some predetermined load or pedal force has been applied to the rear brake 22. Accordingly, the possibility of excessive front wheel braking is minimized. Alternatively, the front brake 24 can be actuated independently of the system of the present invention in response to manipulating the hand lever 28. Towards this end, it will be seen that the master cylinder 36 is in direct fluid communication with the caliper assembly 38 by a fluid path defined by the conduit 40, the passage 110, the annular passage 90, the fluid passage 114, and the conduit 112. Therefore, manipulation of the hand lever 28 will actuate the brake 38 if it is desired to solely apply the front brake 24.

The mechanism 60 provides a means whereby in a sense, the rate of application of the front brake relative to that of the rear brake can be selectively controlled to provide for a desired proportion of front brake to rear brake application so that overbraking on the front brake is effectively prevented. Rate, here, is considered as the degree of brake application relative to an input force or load applied by the vehicle operator. In the front and rear wheel brakes in a conventional motorcycle, there will be some resilient means such as a spring which will normally function to return or release each of the front and rear brakes to predetermined deactuated positions after the cyclist has removed the brake actuating force. The characteristics of the spring 92 and accordingly the hold-off or rate characteristics of the mechanism 60 will be selected to operate in conjunction with these front and rear brake resilient means to provide the desired braking effect as noted above. Moreover, as required, the length of the rear brake lever 34 can be adjusted in conformance with a particular braking system to be devised.

Figure 4:
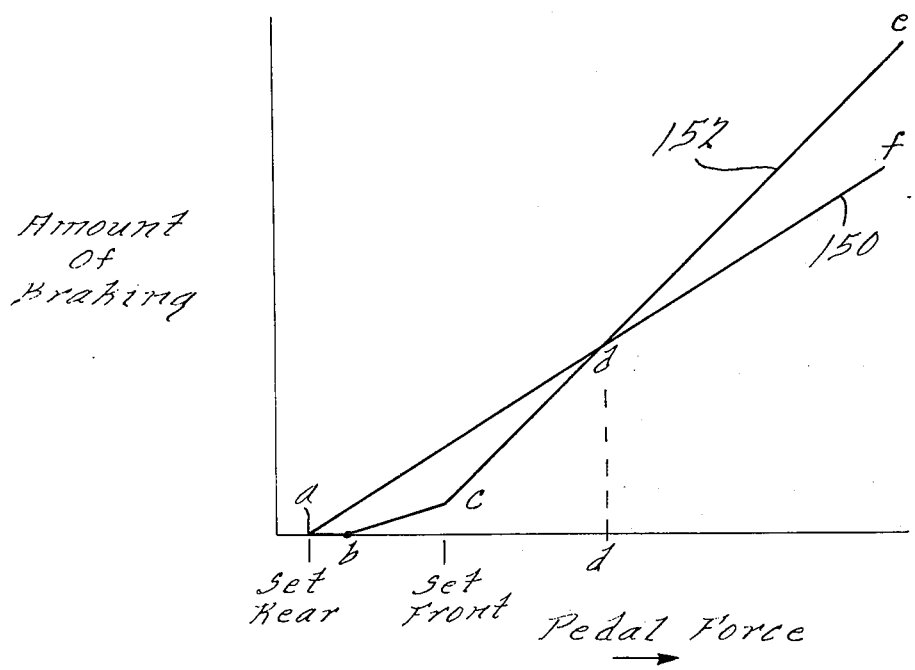
FIG. 4 is a graph depicting an exemplary braking system of the front and rear brakes in accordance with the system of the present invention.

In FIG. 4, an exemplary diagram or graph depicts an optimal braking system in accordance with the mechanism 60 of the present invention. The X-axis of the graph is representative of the force applied to the brake foot pedal 26 by the cyclist, and the Y-axis is designated the amount of braking, i.e. the retardant force at the wheel where it contacts the ground. Considering an exemplary vehicle stopping cycle. It will be seen that the initial depression of the foot pedal 26 results in overcoming the bias of the resilient means of the rear brake 22 including any lost motion inherent to the linkage between the lever 34 and foot pedal 26. Accordingly, a point designated by the letter $a$ is reached wherein the rear brake is set without any amount of braking being applied to either of the front or rear wheels. In response to further depression of the pedal 26, a rear braking curve 150 of substantially constant slope is generated between the point $a$ and a rear wheel lock-up condition indicated by the letter $f$. As the rear brake curve is generated from $a$ toward $f$, the front brake curve indicated at 152 provides no amount of braking until the pedal force reaches a point indicated by the letter $b$, the latter being indicative of the point wherein the force or bias of the spring 92 is overcome and relative movement occurs between the piston 78 and mechanism housing 62 to close the port 110. At this point, the hydraulic fluid commences to be pressurized resulting in initial actuation of the caliper 38 at a first rate toward a point $c$, the letter $c$ being indicative of the point whereat the front brake is set. Thereafter, as the pedal force is increased, a front brake curve having a greater slope is generated to a lock-up condition indicated by the letter $e$. The slope of this portion of the curve 152 (between $c$ and $e$) is greater than the slope of the curve 150 and intersects the curve at a point indicated by the letter $d$. Thereafter in a preferred system, the amount of braking of the front brakes is greater than the braking applied to the rear due primarily to the inherent weight shift from the rear wheel to the front wheel during deceleration of the vehicle which results in a greater pressure being applied to the front wheel relative to the road surface and less pressure acting on the rear wheel. It will be noted that the portion of the curve 152 between the points $d$ and $e$ is indicated as providing a greater amount of braking than the portion of the curve 150 between the points $d$ and $f$. This demonstrates that the preferred system is adapted to take full advantage of the inherent weight shift. These characteristics are, however, subject to modification, but in view of the fact that a common actuating device is utilized to operate both of the brakes, virtually any modified system would still minimize the possible loss of stability and function to stop the vehicle in a substantially more optimum distance than if the brakes were operated individually. With reference to the curves 150 and 152 illustrated in FIG. 4, it will be noted that any desired slope or characteristic can be arrived at by changing the length of the lever arm 34, by changing the return springs of each of the front and rear brakes 22 and 24, by changing the spring force of the spring 92, and also by changing the effective area of the piston 78, applying known engineering principles. In the preferred system the vehicle braking system is so constructed to have the braking characteristics illustrated in FIG. 4.

An advantage of the present invention resides in the fact that the mechanism 60 is easily installed as an after market accessory as well as being adapted to be provided by an original equipment manufacturer. Note that the installation can be accomplished by disassembling an existing connection between the connecting rod 32 and the brake lever arm 34. The mechanism 60 is then retro-fitted to the linkage by merely sliding the mechanism 60 over one end of the rod 32, threadably engaging the adjustment screw 106 thereon, and then attaching the mechanism 60 to the lever arm 34 by threadably engaging the fasteners 68. Thereafter, the fluid conduits 40 and 112 are connected in accordance with the diagram indicated in FIG. 3 to complete the installation.

It will be seen from the foregoing that the present invention provides a novel braking actuating mechanism which is intended to overcome or at least minimize the problems resulting from excessive front wheel brake application while still permitting the front brake to be effectively utilized during deceleration whereby to take full advantage of the weight shift phenomenon of the vehicle. The brake actuating mechanism 60 of the present invention will also be seen to be of extremely simple design and will thus be economical to manufacture. Moreover, by virtue of its extreme simplicity of design, the mechanism 60 may be used and associated with a large number of different types of two-wheeled vehicles having front hydraulic and rear mechanical wheel braking systems whereby to provide for universality of application. With respect to the physical appearance of the mechanism 60, it will be noted that the form of the invention illustrated in FIG. 2 will find primary application as an after market accessory. When incorporated with a component by an original equipment manufacturer, the device may take a drastically different appearance and may be incorporated as a subassembly in a wheel hub. It will be understood that the mechanism of the present invention is in no way limited to the embodiments disclosed and is included in this specification merely for the purpose of being exemplary.

While it will be apparent that the preferred embodiments illustrated herein are well calculated to fulfill the objects above stated, it will be appreciated that the present invention is susceptible to modification variation and change without departing from the scope of the invention.

What is claimed is:

1. A braking system for a two wheeled vehicle including a caliper associated with a front disc brake and operable in response to pressurizing a hydraulic fluid, a lever arm associated with a rear mechanical brake and operable in response to selective displacement of a linkage and a reservoir providing a source of pressurized fluid media, the improvement comprising a mechanism for actuating said front brake subsequent to said rear brake, said mechanism including a housing defining a fluid cylinder having first and second ports and an end portion pivotably connected to said lever arm, first means for communicating said reservoir with one of said first and second ports, second means for communicating said caliper with the other of said ports, and third means located in said cylinder for initially blocking said first port and subsequently pressurizing said caliper in response to displacing said linkage.

2. The system as recited in claim 1 wherein said reservoir comprises a combination master cylinder-fluid reservoir fixedly connected to a handle bar of said vehicle and actuatable to apply said front brake independently of said rear brake.

3. The system as recited in claim 2 wherein said combination master cylinder-fluid reservoir is inoperative when said first port is blocked.

4. The system as recited in claim 1 wherein said linkage includes a connecting rod adjustably connected to said third means.

* * * * *